United States Patent

Brun et al.

[11] Patent Number: 6,110,527
[45] Date of Patent: Aug. 29, 2000

[54] SILICON CARBIDE COMPOSITE WITH METAL NITRIDE COATED FIBER REINFORCEMENT

[75] Inventors: Milivoj Konstantin Brun, Ballston Lake; Krishan Lal Luthra; Raj Narain Singh, both of Schenectady, all of N.Y.

[73] Assignee: General Electric Company, Schenectady, N.Y.

[21] Appl. No.: 08/248,583

[22] Filed: May 24, 1994

Related U.S. Application Data

[63] Continuation of application No. 08/057,919, May 7, 1993, abandoned, which is a continuation of application No. 07/716,444, Jun. 17, 1991, abandoned.

[51] Int. Cl.$^7$ ........................................... B05D 7/00
[52] U.S. Cl. ..................... 427/214; 427/217; 427/228; 427/249; 427/250; 427/255; 427/376.6; 427/419.7; 427/432
[58] Field of Search ...................... 427/214, 217, 427/228, 249, 250, 255, 376.6, 419.7, 432

[56] References Cited

U.S. PATENT DOCUMENTS

| | | | |
|---|---|---|---|
| 4,148,894 | 4/1979 | Hillig et al. | 428/242 |
| 4,536,449 | 8/1985 | Kennedy et al. | 428/408 |
| 4,889,686 | 12/1989 | Singh et al. | 419/13 |
| 4,929,472 | 5/1990 | Sugihara et al. | 427/215 |
| 4,931,311 | 6/1990 | Singh et al. | 427/56.1 |
| 4,935,055 | 6/1990 | Aghajanian et al. | 164/66.1 |
| 4,937,101 | 6/1990 | Gray | 427/228 |
| 4,944,904 | 7/1990 | Singh et al. | 269/60 |
| 5,015,540 | 5/1991 | Borom et al. | 428/698 |
| 5,024,859 | 6/1991 | Millard et al. | 427/226 |
| 5,051,300 | 9/1991 | Rousseau | 428/245 |
| 5,227,249 | 7/1993 | Lukco et al. | 428/614 |

OTHER PUBLICATIONS

"Ceramic Coatings for Carbon–Carbon Composites", JR Strife & JE Sheehan, Ceramic Bulletin, vol. 67, No. 2, 1988, pp. 369–374.
Handbook of Chemistry and Physics, CRC Press, 63rd Edition, 1982–83—Inside Cover.

*Primary Examiner*—Benjamin L. Utech
*Attorney, Agent, or Firm*—Noreen C. Johnson; Douglas E. Stoner

[57] ABSTRACT

A composite comprised of reinforcement fibers having a continuous coating of a metal nitride wherein the metal is from the group consisting of silicon, aluminum, titanium, zirconium, hafnium, niobium, tantalum, and mixtures thereof, and a molten silicon infiltration formed silicon carbide matrix. The reinforcement fibers are fibers from the group consisting of elemental carbon, silicon carbide, and mixtures thereof. A method of forming the composite comprises depositing a continuous coating of the metal nitride on the fibers. A carbonaceous material is admixed with the coated fibers so that at least 5 volume percent of the mixture is the coated fibers. The mixture is formed into a preform having an open porosity ranging from about 25 volume percent to about 90 volume percent of the preform. The preform is heated in an inert atmosphere or partial vacuum, and infiltrated with molten silicon to produce an infiltrated product having the composition of the composite.

7 Claims, No Drawings

SILICON CARBIDE COMPOSITE WITH METAL NITRIDE COATED FIBER REINFORCEMENT

This application is a Continuation of application Ser. No. 08/057,919 filed May 7, 1993, now abnd which is a Continuation of Ser. No. 07/716,444, filed Jun. 17, 1991 now abnd. This application is related to applications Ser. No. 07/056,516 now U.S. Pat. No. 5,403,019, filed Jun. 1, 1987, Ser. No. 07/001,806 now U.S. Pat. No. 5,255,163, filed Sep. 24, 1987, Ser. No. 07/714,417, filed Jun. 12, 1991, now abandoned, Ser. No. 07/716,442, filed Jun. 17, 1991, now abandoned, and Ser. No. 07/716,443, filed Jun. 17, 1991 now abandoned.

This invention relates to a composite and method for forming the composite, comprised of coated silicon carbide fibers in a matrix of silicon carbide.

U.S. Pat. Nos. 4,120,731; 4,141,948; 4,148,894; 4,220,455; 4,238,433; 4,240,835; 4,242,106; 4,247,304; 4,353,953; 4,626,516; 4,889,686; and 4,944,904; assigned to the assignee hereof and incorporated herein by reference, disclose molten silicon infiltration of materials which include carbon, molybdenum, carbon-coated diamond, cubic boron nitride, and blends of carbon with silicon carbide, boron nitride, silicon nitride, aluminum oxide, magnesium oxide and zirconium oxide.

High temperature fiber reinforced composites have great potential for use in aircraft and gas turbines due to the high strength to weight ratio of such materials. Composites of carbon fiber reinforced carbon matrices have been used in aircraft construction, but poor oxidation resistance has limited use to low temperature applications of 1000° C. or less. High strength carbon fibers have been infiltrated with molten silicon to provide a silicon matrix for protecting the carbon fiber reinforcements. However, the silicon infiltration converts the carbon fiber reinforcements into relatively weak, irregular columns of silicon carbide crystals resulting in composites with low toughness and relatively modest strength.

As an alternative approach, attempts have been made to incorporate silicon carbide fibers in a silicon matrix by the process of silicon infiltration. Unfortunately, silicon carbide has a limited solubility in molten silicon, and leads to transport and recrystallization of silicon carbide causing the silicon carbide fibers to loose substantial strength. Also, silicon carbide forms a strong bond with silicon so the fiber bonds to the matrix resulting in brittle fracture of the composite. In ceramic composites, a relatively weak bond at the fiber-matrix interface is preferred in order to achieve improved fracture toughness. Toughness is improved in fiber reinforced composites when the fiber reinforcement does not bond with the surrounding matrix, so that force applied to the matrix is transferred from the matrix to the fiber substantially by friction.

It is an object of this invention to provide molten silicon infiltration formed fiber reinforced composites having improved toughness and oxidation resistance.

It is another object of this invention to provide molten silicon infiltration formed fiber reinforced composites having protective coatings for the fibers.

It is another object of this invention to provide a method of forming molten silicon infiltration formed fiber reinforced composites having improved toughness and oxidation resistance.

BRIEF DESCRIPTION OF THE INVENTION

Composites having improved toughness are comprised of reinforcement fibers having a continuous coating of a metal nitride wherein the metal is from the group consisting of silicon, aluminum, titanium, zirconium, hafnium, niobium, tantalum, and mixtures thereof, and a molten silicon infiltration formed silicon carbide matrix. The reinforcement fibers are from the group consisting of elemental carbon, silicon carbide, and mixtures thereof. The metal nitride coating protects the reinforcement fibers during molten silicon infiltration forming of the matrix so that the fiber has a desirable debonding from the matrix. The metal nitride coating also reduces reaction between the matrix and fibers during high temperature service.

A process for producing tough fiber reinforced composites having fibers from the group consisting of elemental carbon, silicon carbide, and mixtures thereof, comprises depositing a continuous metal nitride coating wherein the metal is from the group consisting of silicon, aluminum, titanium, zirconium, hafnium, niobium, tantalum, and mixtures thereof on the fibers. The coated fibers are admixed with a carbonaceous material to form a mixture having at least 5 volume percent of the fibers. The mixture is formed into a preform having an open porosity ranging from about 25 percent by volume to about 90 percent by volume of the perform. The preform is heated in an inert atmosphere or partial vacuum, and infiltrated with molten silicon to produce an infiltrated product having the composition of the composite.

DETAILED DESCRIPTION OF THE INVENTION

As used herein, the terms "fiber or fibers" include fibers, filaments, whiskers, tows, cloth, and combinations thereof. The fibers to be coated with metal nitride are selected from the group consisting of elemental carbon, silicon carbide and combinations thereof.

Reference herein to a fiber of silicon carbide includes presently available single crystal or polycrystalline fibers, or wherein silicon carbide envelops a core, and which generally are produced by chemical vapor deposition of silicon carbide on a core such as, for example, elemental carbon or tungsten. There are processes known in the art which use organic precursers to produce silicon carbide containing fibers which may introduce a wide variety of elements into the fibers. Examples of known silicon carbide fibers are Nicalon silicon carbide fibers, Nippon Carbon, Japan, HPZ and MPDZ silicon carbide fibers, Dow Corning, and fibers having the trade name SCS-6, or SCS-0 produced by Textron, Mass. Additional information about silicon carbide fibers can be found in "Boron and Silicon Carbide Fibers," T. Schoenberg, ENGINEERED MATERIALS HANDBOOK Volume 1 COMPOSITES, ASM International, 1987, pp 58–59, incorporated herein by reference.

Reference herein to fibers of carbon include amorphous, single crystalline or polycrystalline carbon fibers such as derived from the pyrolysis of rayon, polyacrylonitrile or pitch. The fibers to be coated with metal nitride are stable at the infiltration temperature used in the process. Preferably, the fibers have at room temperature, i.e. about 22° C., in air a minimum tensile strength of about 100,000 psi and a minimum tensile modulus of about 25 million psi. Additional information about carbon fibers can be found in, "CARBON FIBERS," J. B. Donnet, O. P. Dahl, ENCYCLOPEDIA OF PHYSICAL SCIENCE AND TECHNOLOGY, Vol. 2, 1987, pp. 515–527, incorporated herein by reference.

The fibers can be used as a continuous filament, or as discontinuous fibers, which frequently have an aspect ratio of at least 10, and in one embodiment it is higher than 50, and yet in another embodiment it is higher than 1000. The fibers are admixed with a carbonaceous material. Low aspect ratio fibers are preferred in a random mixture of the fibers and carbonaceous material, since the low aspect ratio fibers pack better and produce high density preforms. On the other hand, in an ordered array of fibers, high aspect ratio fibers are preferred since they produce composites with the highest density of reinforcement and the best mechanical properties. Generally, the fibers range from about 0.3 micron to about 150 microns in diameter, and from about 10 microns to about 10 centimeters in length or longer. Frequently, the fiber is continuous and as long as desired.

Continuous fibers can be filament-wound to form a cylindrical tube, or formed into sheets by placing long lengths of fiber next to and parallel to one another. Such sheets can consist of single or multiple layers of filaments. Continuous filaments can also be woven, braided, or otherwise arrayed into desired configurations. When fibers are continuous or very long the use of the term "aspect ratio" is no longer useful.

The metal nitride coating can be deposited by methods well known in the art for depositing a continuous coating without damaging the fiber. Coating processes such as chemical vapor deposition, or physical vapor deposition processes such as sputtering are suitable. A continuous coating is deposited covering the entire surface of the reinforcement phase fibers, the ends of the fiber may be exposed but such exposure is not considered significant. Preferably, the metal nitride coating is uniform and smooth to minimize mechanical interlocking between the coating and matrix. Additional information about such coating processes can be found, for example in, "Metallic & Ceramic Coatings: Production, High Temperature Properties & Applications," M. G. Hocking, V. Vasantasree, P. S. Sidky, Longman Scientific & Technical, Essex England, 1989, incorporated herein by reference.

Generally, the chemical vapor deposition of metal nitride is carried out at temperatures ranging from about 900° C. to 1800° C. in a partial vacuum with the particular processing conditions being known in the art or determinable empirically.

The metal nitride coating is at least sufficiently thick to be continuous and free of significant porosity. Coating thickness can range from about 0.1 micron to about 5 microns, and typically it is about 1.5 microns for fibers about 100 to 200 microns in diameter. The particular thickness of the coating is determinable empirically, i.e. it should be sufficient to prevent reaction, or prevent significant reaction, between the fibers and the infiltrating silicon under the particular processing conditions used. During the infiltration process, the metal nitride coating may or may not react with or dissolve in the molten silicon depending on time and temperature, i.e., the metal nitride coating will survive better at lower temperatures and for shorter times of infiltration. Generally, silicon infiltration time increases with the size of the preform. Therefore, larger-sized preforms may require thicker metal nitride coatings.

A number of techniques can be used to determine if the metal nitride coating survived. For example, if the composite exhibits fiber pull-out on fracture, the metal nitride coating has survived. Also, scanning electron microscopy of a cross-section of the composite can detect a metal nitride coating on the fiber.

Optionally, the metal nitride-coated fibers can be coated with a continuous coating of a second layer from the group consisting of carbon, metal that reacts with silicon to form a silicide, metal carbide, metal silicide, metal nitride, and metal diboride, on the metal nitride coating. In addition, non-carbonaceous second layers can be coated with a third layer of carbon to promote wetting with the molten silicon infiltrant. Elemental carbon can be deposited on the metal nitride-coating by known methods, for example, in the form of pyrolytic carbon. The metal carbide is a carbide of silicon, tantalum, titanium or tungsten, the metal silicide is a silicide of chromium, molybdenum, tantalum, titanium, tungsten or zirconium, the metal nitride is a nitride of silicon, aluminum, titanium, zirconium, hafnium, niobium, tantalum, or boron, and the metal diboride is a diboride of titanium, zirconium, hafnium, or aluminum.

The metal reacting with silicon to form a silicide, and the silicide, must have melting points higher than the melting point of silicon and preferably higher than about 1450° C. Generally, the metal and silicide thereof are solid in the infiltration process. Representative of such metals is chromium, molybdenum, tantalum, titanium, and tungsten.

The second layer should be free of significant porosity and preferably is pore-free. Preferably, the second layer is uniform and smooth. Generally, the thickness of the second layer ranges from about 500 Angstroms to about 3 microns, and typically it is about 0.5 microns. The particular thickness of the second layer is determinable empirically and depends largely on the rate of consumption of the second layer, if any, and the particular composite desired.

The second layer is a solid which covers the metal nitride and adheres sufficiently to form a coating thereon. Throughout the infiltration process the second layer remains a solid. The second layer can promote contact or wetting to improve the infiltration by capillarity, provide a desirable debonding with the matrix, protect the metal nitride coating from the molten silicon infiltrant, or reduce reaction between the matrix and the fiber during high temperature service.

Known techniques can be used to deposit the second layer, for example, the second layer can be deposited by chemical vapor deposition using low pressure techniques, or physical vapor deposition techniques such as sputtering. For example, the metal carbide or metal silicide coating can be directly deposited from the vapor thereof. Alternatively, the metal carbide coating can be formed in situ by initially depositing carbon followed by depositing metal thereon under conditions which form the metal carbide. If desired, a metal silicide coating can be produced by initially depositing the metal followed by deposition of silicon under conditions which form the metal silicide.

A carbonaceous material is admixed with or deposited on the coated fibers to produce a mixture that is formed into a preform. The carbonaceous material is at least comprised of material which is wetted by molten silicon. The carbonaceous material as well as any reaction product thereof produced in the infiltration process should not flow to any significant extent and preferably is solid in the infiltration process. The particular composition of the carbonaceous material is determinable empirically and depends on the particular composite desired, i.e. the particular properties desired in the composite. However, the carbonaceous material contains sufficient elemental carbon to react with the infiltrating silicon to produce the composite containing silicon carbide formed in situ in an amount of at least about 5% by volume of the composite. Generally, elemental carbon ranges from about 5% by volume, or from 10% or 20% by volume, to about 100% by volume, of the carbonaceous material.

As used herein, the term elemental carbon includes particles, flakes, whiskers, or fibers of amorphous, single crystal, or polycrystalline carbon, graphite, carbonized plant fibers, lamp black, finely divided coal, charcoal, and carbonized polymer fibers or felt such as rayon, polyacrylonitrile, and polyacetylene.

The carbonaceous material can be in the form of a carbon vapor infiltration formed coating, a powder, a fibrous material or a combination thereof. When the carbonaceous material is in the form of a powder, it preferably has an average particle size of less than about 50 microns, preferably, the carbon particles have a particle size of about 1 to 15 microns, and most preferably, have a particle size of about 1 to 5 microns. The carbon powder serves as a source of carbon to react with the infiltrant and form silicon carbide, and as a binder to maintain the shape and integrity of the preform. However, an excessive volume fraction of carbon powder particles can cause swelling and cracking of the infiltrated composite. The carbon powder particles can have a density of about 1.2 to 2.2 grams per milliliter. Preferably, the carbon powder particles are a low density amorphous carbon having a density of about 1.2 to 1.6 grams per milliliter. A suitable carbon powder is a Dylon aqueous graphite powder suspension, Dylon Industries, Inc., Ohio. Other sources for carbon powder are Johnson Matthey, Mass., and Great Lakes Carbon, N.Y. The amount and type of carbonaceous material depends largely on the particular composite desired and is determinable empirically.

Preferably, the preform contains some fibrous carbon in the form of chopped fibers or whiskers. The whiskers promote infiltration by wicking molten silicon into the preform and are a source of carbon for reacting with the infiltrant to form silicon carbide. Long whisker lengths are desirable to achieve good wicking, while short whisker lengths result in better packing and less porosity to fill in the preform. The whiskers also provide strength to the preform. Chopped fibers or whiskers can be described by the aspect ratio of the fiber, fiber length to diameter. Preferably, the whiskers have an average aspect ratio that promotes wicking, and packs with the other components in the preform to provide the desired porosity in the preform. Preferably, the whiskers have an average diameter that allows complete reaction with the molten silicon. For example, a suitable whisker has an aspect ratio of about 5 to 50, and a fiber diameter of about 0.5 to 25 microns. Most preferably, the aspect ratio is about 5 to 15 and the whisker diameter is about 3 to 10 microns. The whiskers can be graphitic, or preferably, amorphous. The whiskers have a density of about 1.2 to 2.2 grams per milliliter, preferably, about 1.2 to 1.6 grams per milliliter. Low density furnace insulation type WDF, carbon felt, available from Union Carbide, can be crushed and abraded against a wire mesh screen, for example about 40 mesh, to form suitable whiskers. Low density carbon fiber can be formed by carbonizing naturally occurring cellulose fibers, including cotton, chitosan, and bamboo, and chopped or crushed to form the whiskers.

The carbonaceous material also may include a metal which reacts with elemental silicon to form a silicide. Representative of such a metal is molybdenum, chromium, tantalum, titanium, tungsten and zirconium. The metal may comprise up to about 25% by volume of the carbonaceous material, and preferably about 5% by volume.

The carbonaceous material may also include a ceramic material, in an amount up to about 50 percent by volume of the carbonaceous material. The ceramic material is may or may not react with silicon, and is a ceramic such as a ceramic carbide, a ceramic nitride or a ceramic silicide. The ceramic carbide is selected form the group consisting of boron carbide, molybdenum carbide, niobium carbide, silicon carbide and titanium carbide. The ceramic nitride is selected from the group consisting of aluminum nitride, niobium nitride, silicon nitride, titanium nitride and zirconium nitride. The ceramic silicide is selected from the group consisting of chromium silicide, molybdenum silicide, tantalum silicide, titanium silicide, tungsten silicide and zirconium silicide.

The carbonaceous material is admixed with the coated fibers in a manner that minimizes damage to the fiber coating of metal diboride, and if present, minimizes damage to the second layer of coating on the fiber. Mixing can be carried out in a known and conventional manner. In one embodiment, a slurry of the carbonaceous material can be cast in a mold containing the coated fibers to form a mixture. The slurry can be an organic slurry containing known bonding means, such as for example epoxy resin, to aid in forming the preform.

The mixture can be formed or shaped into a preform or compact by a number of known techniques. For example, it can be extruded, injection molded, die-pressed, isostatically pressed or slip cast to produce the preform of desired size and shape. Preferably, the preform is of the size and shape desired of the composite. Generally, there is no significant difference in dimension between the preform and the resulting composite. Any lubricants, binders, or similar materials used in shaping the mixture are of the type which decompose on heating at temperatures below the infiltration temperature, preferably below 500° C., without leaving a residue that degrades the infiltration or mechanical properties of the resulting composite. It should be understood a suitable binder may leave a porous carbon deposit that does not degrade the infiltration or mechanical properties of the resulting composite.

The preform has an open porosity ranging from about 25% by volume to about 90% by volume of the preform, and the particular amount of such open porosity depends largely on the particular composite desired. Frequently, the preform has an open porosity ranging from about 30% by volume to about 80% by volume, or from about 40% by volume to about 60% by volume, of the preform. By open porosity of the preform, it is meant herein pores, voids or channels which are open to the surface of the preform thereby making the interior surfaces accessible to the ambient atmosphere or the infiltrant. Preferably, the preform has no closed porosity. By closed porosity it is meant herein closed pores or voids, i.e. pores not open to the surface of the preform and therefore not in contact with the ambient atmosphere. Void or pore content, i.e. both open and closed porosity, can be determined by standard physical and metallographic techniques.

Preferably, the pores in the preform are small, ranging from about 0.1 micron to about 50 microns, and are distributed uniformly through the preform thereby enabling the production of a composite wherein the matrix phase is uniformly distributed through the composite.

The preform is contacted with silicon-associated infiltrating means whereby silicon is infiltrated into the preform to form a molten silicon infiltration formed silicon carbide matrix. The infiltrating means allow silicon to be infiltrated into the preform. For example, a structure or assembly is formed comprised of the preform in contact with means that are in contact with silicon and which permit infiltration of molten silicon into the preform. In one infiltration technique, the preform is placed on a woven cloth of elemental carbon, a piece of silicon is also placed on the cloth, and the resulting structure is heated to the infiltration temperature. At the infiltration temperature, the molten silicon migrates along the cloth and wicks into the preform. After infiltration, the wicking carbon cloth may be removed from the composite by diamond grinding.

In another technique, the silicon infiltration procedure can be carried out as set forth in U.S. Pat. No. 4,626,516, incorporated herein by reference, which discloses an assembly that includes a mold with infiltration holes and a reservoir holding elemental silicon. The preform is placed within the mold and carbon wicks are provided in the infiltrating holes. The wicks are in contact with the preform and also with the silicon and at infiltration temperature the molten silicon migrates along the wicks into the preform.

U.S. Pat. No. 4,737,328 incorporated herein by reference, discloses another infiltration technique which comprises contacting the preform with a powder mixture composed of silicon and hexagonal boron nitride, heating the resulting structure to a temperature at which the silicon is fluid and infiltrating the fluid silicon into the preform. After infiltration, the resulting porous hexagonal boron nitride powder is brushed off the composite.

Preforms having a simple square or rectangular shape can be infiltrated by placing silicon directly on the preform, and heating to a temperature at which the silicon is fluid. The molten silicon wicks into and infiltrates the preform.

The preform and infiltration structure or assembly are heated to the infiltration temperature in an inert atmosphere or partial vacuum. Suitable inert atmospheres include argon, or reducing atmospheres such as hydrogen or carbon monoxide. Atmospheres that react with molten silicon, such as oxygen or nitrogen, are avoided. The remaining atmosphere of the partial vacuum should be inert, such as argon, or reducing such as carbon monoxide. Preferably, the partial vacuum is provided before heating is initiated. The partial vacuum is at least sufficient to avoid the entrapment of pockets of gas, and minimizes porosity in the infiltration formed composite. Generally, such a partial vacuum ranges from about 0.01 torr to about 2 torr, and usually from about 0.01 torr to about 1 torr to remove gas evolving in the preform being infiltrated.

Preferably, the furnace used is a carbon furnace, i.e., a furnace constructed essentially from elemental carbon. Such a furnace reacts with oxygen in the furnace atmosphere to produce CO or $CO_2$ and thereby provides a nonoxidizing atmosphere so that reaction between the residual gas, preform, and infiltrant is minimized. Infiltration cannot be carried out in air because the liquid silicon would oxidize to form a dense silica coating before any significant infusion by silicon occurred. When a carbon furnace is not used, it is preferable to have a material that reacts with oxygen, such as elemental carbon, present in the furnace chamber in order to provide a nonoxidizing atmosphere. Alternatively, other nonoxidizing atmospheres inert to the infiltration process can be used at partial vacuums of about $10^{-2}$ torr to 2 torr.

Infiltration is performed at a temperature where silicon is molten, but below the temperature where the silicon infiltrant begins to damage the fibers or metal nitride coating on the fibers. Molten silicon has a low viscosity. The melting point of the silicon can vary depending largely on the particular impurities which may be present. The infiltration temperature ranges from about 1400° C. to about 1550° C., and preferably from about 1425° C. to about 1450° C. The rate of penetration of the silicon into the preform depends on the wetting of the preform by the silicon melt, and the fluidity of the melt. As the infiltration temperature increases, the ability of the molten silicon to wet the preform improves.

Sufficient silicon is infiltrated into the preform to react with the preform and produce the infiltration formed silicon carbide matrix. Specifically, the molten silicon is mobile and highly reactive with elemental carbon, i.e. it has an affinity for elemental carbon, wetting it and reacting with it to form silicon carbide. The molten silicon also has an affinity for the metals with which it reacts to form silicides. In addition, sufficient silicon is infiltrated into the preform to fill pores or voids which may remain in the composite.

The preform can be infiltrated with substantially pure silicon, or molten silicon comprised of the metal in the coating on the fiber up to an amount that does not degrade the infiltration or mechanical properties of the resulting composite. As used herein, the term "molten silicon" means essentially elemental silicon and up to about 10 atomic percent, preferably up to 5 atomic percent, and most preferably up to 1 atomic percent of the metal in the coating on the fiber, i.e., titanium, zirconium, hafnium, aluminum, niobium, tantalum, boron, molybdenum, or tungsten. Infiltration with molten silicon comprised of the metal in the coating on the fiber reduces or minimizes reaction between the infiltrating molten silicon and the fiber coating.

The period of time required for infiltration by the silicon is determinable empirically and depends largely on the size of the preform and extent of infiltration required. Generally, it is completed in less than about 20 minutes, and often in less than about 10 minutes.

The resulting infiltrated body is cooled in an atmosphere and at a rate which minimizes oxidation, cracking, or other defect formation within the body. Preferably it is furnace cooled in the inert atmosphere or partial vacuum to about room temperature, and the resulting composite is recovered.

The infiltration formed composite has a porosity of less than about 20% by volume, preferably less than about 10% or 5% by volume, and more preferably less than about 1% by volume, of the composite. Most preferably, the composite is void or pore-free or has no significant or no detectable porosity. Preferably, any voids or pores in the composite are small, preferably less than about 50 microns or less than about 10 microns, and are substantially uniformly distributed in the composite. Specifically, any voids or pores are uniformly distributed throughout the composite so that they have minimal effect on the mechanical properties of the composite.

The composite of this invention is comprised of metal nitride-coated fibers and a molten silicon infiltration formed silicon carbide matrix. The matrix is distributed through the metal nitride-coated fibers so that the matrix is space filling and interconnecting. Preferably, the metal nitride-coated fibers are totally enveloped by the matrix. The fibers comprise at least about 5% by volume, or at least about 10% by volume of the composite. The matrix contains a silicon carbide phase formed in situ in an amount of about 5% to 90% by volume, or about 10% to 80% by volume, or about 30% to 60% by volume, or about 45% to 55% by volume, of the composite. The matrix may contain an elemental silicon phase in an amount of about 1 to 30% by volume of the composite. The silicon carbide phase is distributed throughout the composite, and preferably, it is distributed uniformly.

In one embodiment, the elemental silicon phase in the matrix is free of titanium, zirconium, hafnium, aluminum, niobium, tantalum, boron, molybdenum, or tungsten. In another embodiment, the molten silicon has an element from the group consisting of titanium, zirconium, hafnium, aluminum, niobium, tantalum, boron, molybdenum, and tungsten dissolved therein ranging from a detectable amount up to about 10 atomic percent, preferably up to 5 atomic percent, and most preferably up to 1 atomic percent of the elemental silicon phase. More sensitive techniques such as microprobe analysis or Auger electron spectroscopy may be required to detect or determine the amount of titanium, zirconium, hafnium, aluminum, niobium, tantalum, boron, molybdenum, or tungsten dissolved in the silicon phase.

The infiltration formed matrix may contain a phase of a metal silicide of molybdenum, chromium, tantalum, titanium, tungsten, or zirconium up to about 30 percent by volume of the composite. The metal silicide is distributed throughout the composite, and preferably, it is distributed uniformly.

The infiltration formed matrix may contain a phase of a metal which forms a silicide but which had not reacted with the infiltrating silicon. In such instance, it would be encapsulated by a metal silicide phase. Such metal can range from about 0.5% by volume to about 5% by volume, of the composite. The metal is distributed throughout the composite, and preferably, it is distributed uniformly.

The composite may contain a phase of a ceramic material from the group of ceramic carbide, ceramic nitride, or ceramic silicide discussed above. The ceramic material may comprise up to about 50% by volume, or from about 1% by volume to about 30% by volume, of the composite. The ceramic material is distributed throughout the composite, and preferably, it is distributed uniformly.

The infiltration formed silicon carbide matrix of the composite may contain a phase of elemental carbon which has a significant amount of graphitic structure, i.e. a less reactive type of carbon, which had not completely reacted with the infiltrating silicon. In such instance, this type of carbon would be totally encapsulated by a phase of silicon carbide formed in situ. Such graphitic structure-containing elemental carbon generally can range from about 0.5% by volume to about 10% by volume, or from about 1% by volume to about 5% by volume, of the composite. The graphitic structure-containing elemental carbon is distributed throughout the composite, and preferably, it is distributed uniformly.

The composite is at least bonded by silicon carbide formed in situ. It may also be bonded by a metal silicide which formed in situ. It may also be bonded by elemental silicon or a bond formed in situ between silicon and a ceramic material.

The coated fibers in the composite are coated with metal nitride that is detectable by scanning electron microscopy, and can range in thickness from such detectable amount to about 5 microns, frequently from about 0.5 microns to about 1.5 microns. The coating may be comprised of a second layer from the group consisting of metal nitride, metal silicide, metal carbide, and metal diboride, on the metal nitride coating. When a second layer of carbon or metal that reacts with silicon to form a silicide is deposited on the fibers, the second layer reacts with the molten silicon infiltrant and becomes part of the matrix. The particular amount of metal nitride in the composite provided by the metal nitride coating depends largely on the amount of coated fibers present, the thickness of the metal nitride coating, and the diameter of the fiber. Therefore, the volume fraction of metal nitride provided by the coating is the balance of the volume fraction of all other components of the composite. However, in one embodiment, the metal nitride coating on the fibers in the composite ranges from less than about 1% by volume to about 30% by volume, or from about 1% by volume to about 10% by volume, of the total volume of metal nitride-coated fibers. In another embodiment, the metal nitride coating on the fibers ranges from less than 1% by volume to about 20% by volume, or from about 1% by volume to about 5% by volume, of the composite.

The fiber component of the metal nitride-coated fibers ranges form about 5% by volume to less than about 75% by volume, or from about 10% by volume to about 70% by volume, or from about 15% by volume to less than about 65% by volume, or from about 20% by volume to about 50% by volume, of the composite. The metal nitride-coated fiber is distributed throughout the composite, and most often, it is distributed uniformly throughout the composite. However, in some cases it is desirable to have higher packing fractions of the metal nitride-coated fibers in regions of the composite where higher local strength or stiffness may be desired. For example, in a structure having a long thin part, such as a valve stem, it is advantageous to strengthen the stem by increasing the volume fraction of the metal nitride-coated fibers in the stem region of the structure.

The metal nitride-coated fibers in the composite impart significant toughness to the composite. Specifically, the metal nitride-coated fibers minimize brittle fracture of the composite at room temperature, i.e. 25° C. By brittle fracture of a composite it is meant herein that the entire composite cracks apart at the plane of fracture. In contrast to a brittle fracture, the composite exhibits fiber pull-out on fracture at room temperature because the fiber coating provides a desirable debonding of the fiber from the matrix. Specifically, as the composite cracks open, generally at least about 10% by volume, frequently at least about 50% by volume and preferably all of the metal nitride-coated fibers do not break at the plane of fracture, but instead pull out of the matrix. In this way, a stress transmitted through the composite by a crack in the matrix is distributed along the length of fibers in the path of the crack. Distribution of stress along the length of the fibers greatly diminishes the stress at the crack tip and reduces propagation of the crack through the matrix.

One particular advantage of this invention is that the composite can be produced directly in a wide range of sizes and shapes which heretofore may not have been possible to manufacture or which may have required machining operations. For example, the composite can be as short as about an inch or less, or as long as desired. It can be of simple, complex, or hollow geometry. For example, it can be produced in the form of a tube or a hollow cylinder, a ring, a sphere, or a bar having a sharp point at one end. Since the composite can be produced in a predetermined configuration of predetermined dimensions, it requires little or no machining.

The composite has a wide range of applications depending largely on its particular composition. It can be used, for example, as a wear resistant part, bearing or tool insert, acoustical part, or high-temperature structural component.

The invention is further illustrated by the following examples where, unless otherwise stated, the following materials and equipment were used. The preform binder was comprised of "Epon 828" which contained a curing agent. "Epon 828" is a resin formed from the reaction of epichlorohydrin and Bisphenol A, which is a liquid at room temperature and which has an epoxide equivalent of 185–192. Epon 828 decomposes completely below 1300° C. The curing agent was diethylenetriamine, a liquid commonly called DTA which cures Epon 828 thereby solidifying it. The carbon resistance furnace used to form the composite was contained in a vacuum belljar system.

EXAMPLE 1

A silicon nitride coating of about 1 micron was deposited by sputtering on 140 micron diameter silicon carbide fibers, trade name SCS-0, obtained from Textron, Mass. A slurry was prepared by hand-stirring, by weight, 11 parts carbon powder, 17 parts of a solution comprised of epoxy resin and xylene in a one to one ratio, and 0.88 parts DTA catalyst. The coated fibers were laid in a vacuum-casting mold and the slurry was poured over and around the fibers. Liquid in the mold was removed by applying a vacuum of about 100 torr to one end of the mold. The remaining preform with the coated silicon carbide fibers embedded therein, was dried under an infrared lamp for 24 hours to cure the epoxy.

The dried preform was transferred to a vacuum furnace and set on a piece of carbon cloth. An amount of silicon, three times the weight of the carbon in the preform and the carbon cloth, was placed on the carbon cloth so that the silicon was not in direct contact with the preform. The preform was heated at about 2° C. per minute to 500° C. to pyrolize the epoxy, and heated at about 10° C. per minute to 1425° C. The temperature was maintained at 1425° C. for 15 minutes allowing the silicon to melt and infiltrate the preform. The infiltrated preform was furnace cooled. Metallographic inspection of a polished cross-section of the composite showed there was no visible degradation of the fiber, and a distinct boundary was present between the matrix and the silicon nitride coating.

EXAMPLE 2

A silicon nitride coating of about 2 microns was deposited by chemical vapor deposition at the Department of Physics, Brigham Young University, on 140 micron diameter silicon carbide fibers, trade name SCS-6, obtained from Textron, Mass. The silicon nitride coated fibers were incorporated into a preform and infiltrated with silicon as described above in Example 1, to form a silicon carbide fiber reinforced composite. Metallographic inspection of a polished cross-section of the composite showed there was no visible degradation of the fiber, and a distinct boundary was present between the matrix and the silicon nitride coating.

A measure of fiber to matrix bonding was made with a fiber push-out test. A 1 millimeter slice of the composite, perpendicular to the fiber direction, was sectioned from the composite. The push-out stress was measured as the stress required for an indentor about three-quarters of the diameter of the fiber to push the fiber out of the matrix. The fiber push-out stress was about 77 MPa.

What is claimed is:

1. A method for forming a fiber reinforced composite, the fibers being at least one of elemental carbon, or silicon carbide, in a matrix of silicon carbide containing at least a silicon carbide phase and elemental silicon phase formed by molten silicon infiltration comprising: depositing a continuous metal nitride coating on the fibers wherein the metal is selected from the group consisting of silicon, aluminum, titanium, zirconium, hafnium, niobium, or tantalum, the metal nitride coating preventing reaction between the reinforcement fiber and molten silicon;

admixing a carbonaceous material with the coated fibers so that at least 5 volume percent of the mixture is the coated fibers;

forming the mixture into a preform having an open porosity ranging from about 25 volume percent to about 90 volume percent of the preform;

heating the preform in an inert atmosphere or partial vacuum; and infiltrating the heated preform with molten silicon to form the silicon carbide matrix composite.

2. The method of claim 1 wherein the coating is about 0.1 to 5 microns.

3. The method of claim 2 wherein the step of depositing further comprises depositing on the metal nitride coating a second coating selected from the group consisting of: carbon, chromium, molybdenum, tantalum, titanium, tungsten; a metal carbide wherein the metal is silicon, tantalum, titanium, or tungsten; a metal silicide wherein the metal is chromium, molybdenum, tantalum, titanium, tungsten, or zirconium; a metal nitride wherein the metal is silicon, aluminum, titanium, zirconium, hafnium, niobium, tantalum, or boron; and a metal diboride wherein the metal is titanium, zirconium, hafnium, or aluminum.

4. The method of claim 3 wherein the step of depositing further comprises depositing carbon on the coated fibers.

5. The method of claim 1 wherein the metal nitride is from the group consisting of silicon, aluminum, and mixtures thereof.

6. The method of claim 5 wherein the step of depositing further comprises depositing on the metal nitride coating a second coating selected from the group consisting of boron nitride, titanium diboride, zirconium diboride, and hafnium diboride.

7. The method of claim 6 wherein the step of depositing further comprises depositing carbon on the coated fibers.

* * * * *